Feb. 3, 1970   H. S. HAZELTON, JR   3,493,299
SHEET CONVEYING MEANS FOR COPYING MACHINES
Filed Aug. 25, 1966   2 Sheets-Sheet 1
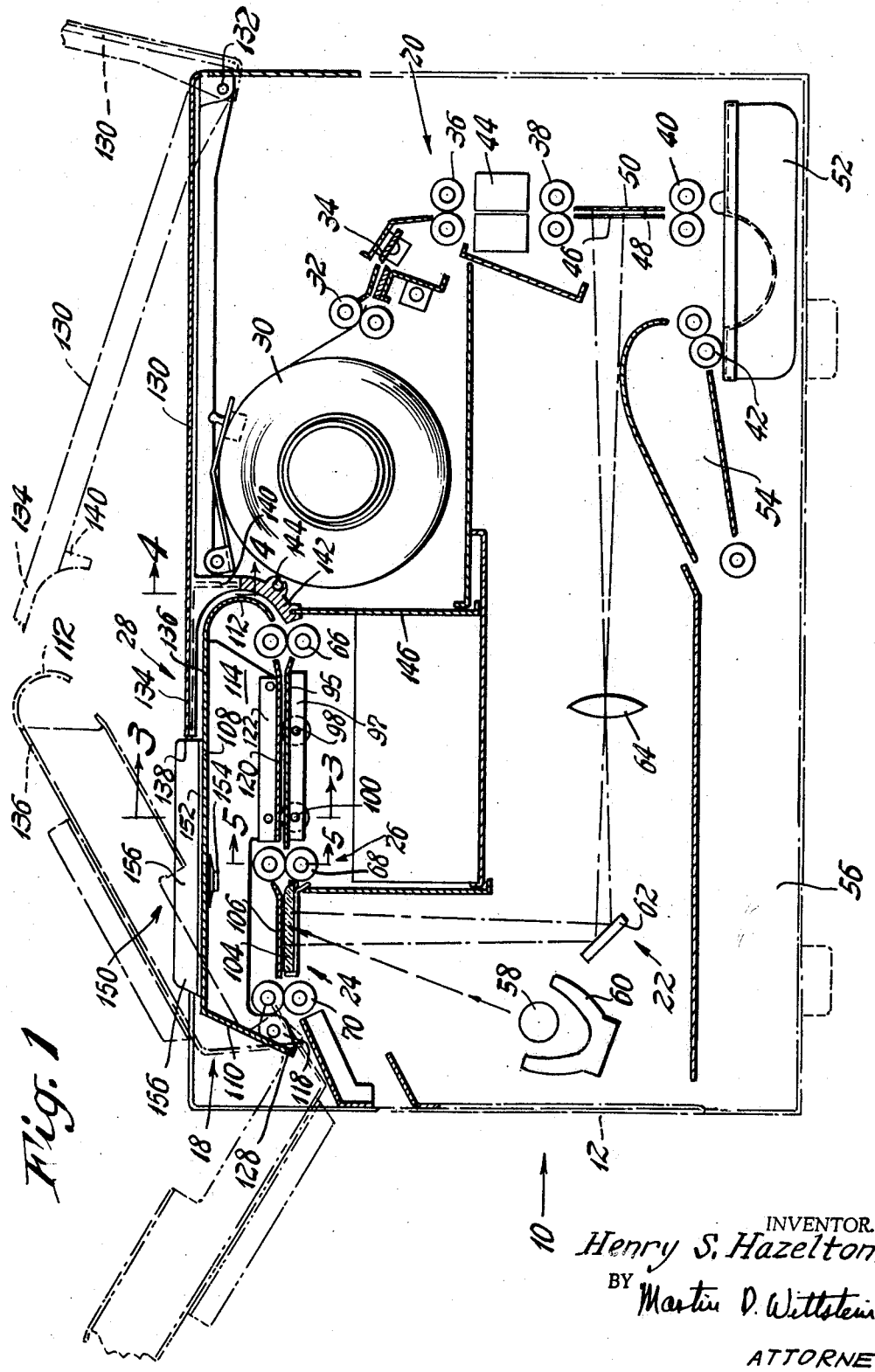
INVENTOR.
*Henry S. Hazelton, Jr.*
BY *Martin D. Wittstein*
ATTORNEY

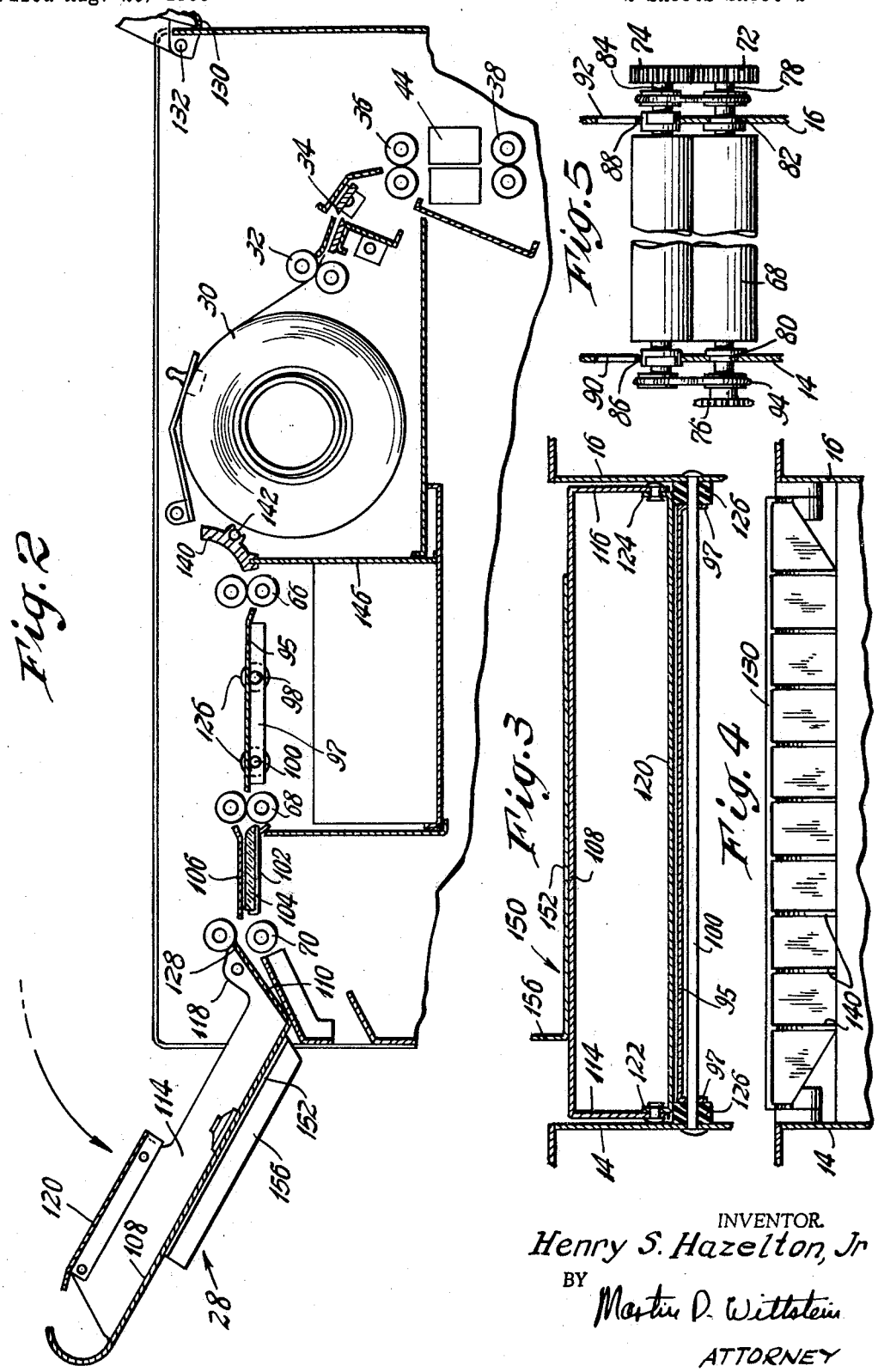

United States Patent Office 3,493,299
Patented Feb. 3, 1970

1

3,493,299
SHEET CONVEYING MEANS FOR COPYING MACHINES
Henry S. Hazelton, Jr., Hawthorne, N.Y., assignor to Pitney-Bowes, Inc., Stamford, Conn., a corporation of Delaware
Filed Aug. 25, 1966, Ser. No. 574,987
Int. Cl. G03b 27/70
U.S. Cl. 355—11       6 Claims

ABSTRACT OF THE DISCLOSURE

A sheet or document conveying means for a photocopy machine through which a document to be copied is fed along a path leading into and through a portion of the machine. A movable guide means defines with other machine structure, the document feed path when the guide means is in one position, and renders the feed path open and accessible for removal of a jammed document when the guide means is in another position.

---

This invention relates generally to improvements in sheet conveying means for copying machines. More particularly it relates to improved means for guiding and feeding an original document to be copied into and through a copying machine wherein the original document is reproduced onto copy paper while both are in motion.

A principal object of the present invention is to provide a sheet conveying means in which a movable element, when in one position, coacts with sheet feeding means to define a feed path or passageway into and through the copying machine, and when in another position, renders the entire feed path and the feeding means readily accessible to an operator of the copying machine.

Machines of the type with which the present invention is concerned are usually relatively small office copying machines having provision for continuously feeding an original document through a location in which the document is subjected to a suitable radiation, usually light, which produces an image of the indicia bearing portions of the original document on a reactive image receiving medium, usually copy paper, which is sensitive to the radiation. The image receiving medium is advanced in synchronism with movement of the original document and the copying process is carried out while both the original document and the copy paper are in motion.

A major disadvantage of such machines arises in the difficulty frequently encountered in causing an original document to properly track through its feed path. Frequently the feed path has one or more sharp or reverse bends therein around which the document must pass. Also, most machines are provided with some form of automatic control, either for a light source or for copy paper feed means or both, which requires paper actuated switches in the document feed path. Still further, some machines have movable gates in the feed path for recirculating the original document through an illuminating station for making multiple copies of the same document.

These features of copying machines are all potential sources of difficulty in the paper feeding art due principally to the fact that paper, due to its thin and highly flexible nature, does not lend itself readily to being pushed, and particularly where the leading edge of the paper must follow a tortuous path and additionally actuate mechanical mechanisms. It therefore frequently occurs that, despite best efforts to overcome the problem, the leading edge of the paper encounters an obstruction obstacle to movement and thereupon jams up in the feed path before an operator is aware of the difficulty and stops the operation of the machine.

2

Another difficulty of prior art copying machines is that when a document does jam in the feed path, considerable difficulty is encountered in removing the document and in doing so without further damaging the document. Frequently, considerable disassembly is required to gain access to the feed path and the feeding means and much time and effort are required to clear the machine. To avoid this, unskilled operators often try to remove the document by pulling on an exposed rear end thereof, usually resulting in the document being torn because it is held between one or more pairs of feed rollers which are connected to a drive mechanism and hence not freely rotatable.

To avoid these difficulties and others mentioned hereinafter, the present invention is directed toward the provision of a sheet conveying means having a movable guide structure which normally encloses the original sheet feed path and defines as well an entryway slot into the feed path, the guide structure being pivotally mounted on the copy machine frame and constructed in such a manner that one swinging movement of the guide structure completely opens up all portions of the feed path and renders the feeding means for the original document exposed and accessible for removal of a jammed document.

Another object of the present invention is to provide a sheet conveying means in which all elements necessary for placing an original document in the copying machine, orienting it properly for entrance into the machine, and guiding it for manual insertion into the feeding means are combined into a single unitary structure.

Still another object of the present invention is to provide a sheet conveying means in which feed rollers are resiliently biased together and the movable guide structure cooperates with at least one pair of such rollers to automatically separate them when the guide structure is moved to an open position.

Yet another object of the present invention is to provide a sheet conveying means in which a guide structure is constructed so as to expose other portions of the copying machine to which access must frequently be had, such as a copy paper supply area.

These and other objects and features of the present invention will become more apparent from an understanding of the following detailed description of a preferred embodiment of the invention when considered in conjunction with the accompanying drawings, in which:

FIG. 1 is a side sectional view of a copying machine embodying the principles of the present invention;

FIG. 2 is a fragmentary view of the machine of FIG. 1 showing the guide structure in the open or accessible position;

FIG. 3 is a sectional view taken on the line 3—3 of FIG. 1;

FIG. 4 is a sectional view taken on the line 4—4 of FIG. 1;

FIG. 5 is a sectional view on an enlarged scale taken on the line 5—5 of FIG. 1.

For the purpose of illustration and as disclosing the invention in a presently preferred form, it is described and shown in conjunction with an electrostatic copying machine in which an original document is illuminated as it passes through the rays from a light source, the indicia bearing portions of the original document being reflected to and through an optical system which projects the image to a strip of photo-conductive copy paper capable of being uniformly electrostatically charged and selectively discharged in accordance with the light pattern projected to it. The latent image thus produced is developed to render it visible by applying finely divided toner particles to the paper which are attracted to the charged areas and then fused thereon.

Referring to FIG. 1, the copying machine 10 comprises a frame 12 having at least two parallel upstanding side walls 14 and 16 (FIG. 3) between which there is arranged an original document handling component 18, a copy paper handling and processing component 20 and an optical system 22.

The document handling component 18 comprises generally an illuminating station 24, a feeding means 26 for feeding a document through the illuminating station 24, and a guide structure 28 which cooperates with the feeding means 26 for conveying the original document into and through the copying machine 10. Since the present invention resides in the novel construction, arrangement and cooperation of parts in the document handling component, a more detailed description thereof is presented hereinafter.

The copy paper handling and processing component 20 comprises a supply of copy paper 30, illustrated in roll form although a supply of cut sheets with an appropriate separating mechanism could be utilized, a pair of feed rollers 32 through which the free end of the copy paper extends, a severing mechanism 34 for severing the web of copy paper after a required amount has been fed, a plurality of roller pairs 36, 38, 40 and 42 defining a copy paper path and for feeding copy paper through an electrostatic charging unit 44, an exposing station 46 defined by guides 48 and 50, a developing tank 52 and a drying chamber 54. Finished copies are delivered to a receiving area or tray 56 for manual removal.

The feed roller pair 32 and the severing mechanism 34 are automatically controlled by a sensing means in the original document path, usually in the form of a microswitch which detects the passage of the leading and trailing edges of the original document as the latter is fed through the document path to start and stop the feed roller pair 32, and to operate the severing mechanism so that a length of copy paper is fed and severed from the web supply 30, corresponding to the length of the original document. Suitable controls for accomplishing this result are well known in the art and form no part of the present invention; accordingly they are not described in further detail.

The optical system 22 comprises a light source or lamp 58 and a reflector 60 which illuminates the original document as it passes through the illuminating station 24. An image of the illuminated portion is reflected to a mirror 62 which in turn reflects the image to and through a focusing lens 64 whereupon the image is projected in sharp focus to the exposing station 46 where it is received by the copy paper passing therethrough.

Returning now to the original document handling component, and referring to FIGS. 1 and 5 it will be seen that the paper feeding means 26 comprises a plurality of feed roller pairs 66, 68 and 70, each of the rollers being mounted on the side frame members 14 and 16. Each lower roller is provided on one outer end with a gear 72 which meshes with a gear 74 on the corresponding upper roller, and each lower roller, on its opposite end, carries a sprocket 76 adapted for engagement with a continuously driven chain (not shown) whereby all roller pairs are synchronously driven. The shaft 78 of the lower roller of each pair is received through a hole 80 and 82 in each side plate 14 and 16, but the shaft 84 of each upper roller is received in a slot 86 and 88, each said slot terminating upwardly in an enlarged hole 90 and 92 respectively. Each roller shaft 78 and 84 carries a pulley on both ends about which a coil spring 94 and 96 extends. The springs 94 and 96 continuously urge the upper rollers into engagement with the lower rollers and yet permit the upper rollers to translate up and down to accommodate original documents of varying thickness. In addition, by removing the springs 94 and 96, the upper rollers may be entirely removed by passing the pulleys and the gears through the openings 90 and 92 respectively.

The roller pairs 66, 68 and 70 define in part a substantially horizontal document feed path extending toward and through the illuminating station 24. The feed roller pairs 66 and 68 are spaced apart as shown due to the fact that a sensing switch for control of the copy paper feed roller pair 32 and the severing mechanism 34 must be as far in advance of the illuminating station 24 as the lead edge of the copy paper is spaced in advance of the exposing station 46. A horizontal plate 95 having downturned flanges 97 is supported by a pair of rods 98 and 100 which extend between the side plates 14 and 16. The plate 95 supports the original document between the roller pairs 66 and 68.

Between the roller pairs 68 and 70, an apertured bracket 102 supports a transparent plate 104 over which the original document passes while being illuminated from the light 58. An upper plate 106 is secured between the side frame members 14 and 16, and the original document passes between the plate 106 and the transparent plate 104.

In accordance with the principles of the invention, the guide structure 28 cooperates with the sheet feeding means 26 when disposed in an operative or closed position shown in solid lines in FIG. 1 to both completely enclose the feeding means 26 and coacts therewith and with the fixed guide plate 95 to further define the horizontal document feed path, as well as to define a restricted entryway into the document feed path and to define an extension thereof in advance of the paper feeding means. Further, the guide structure, when disposed in an inactive or open position as shown in FIG. 2, exposes the entire document feed path and the sheet feeding means to access by an operator of the copying machine.

More specifically, the guide structure 28 comprises a substantially horizontally disposed plate member 108, a forwardly and downwardly extending front wall portion 110 and a rearwardly disposed downwardly curved reverse bend wall portion 112, the latter terminating adjacent the feed roller pair 66, both wall portions 110 and 112 being integrally connected to the plate member 108. The guide structure 28 also comprises downwardly extending side wall portions 114 and 116 which extend substantially the length of the plate member 108 and are integrally connected thereto. Each side wall 114 and 116 has a protruding ear portion 118 located adjacent the lower end of the front wall portion 110 by means of which the guide structure 28 is pivotally connected to the side frame members 14 and 16.

A horizontally disposed wall 120 is suitably secured to the side walls 114 and 116 as by the upturned flanges 122 and 124 respectively, the wall 120 extending between the roller pairs 66 and 68 when the guide 28 is disposed in its closed position as seen in FIG. 1. The wall 120 rests upon a plurality of supports in the form of plastic washers 126 carried by the rods 98 and 100 and which properly space the wall 120 from the plate 95 so that the two cooperate to define a narrow slot through which the original document passes. Thus, it is seen that the wall 120 and the plate 95 form part of the original document feed path and serve to guide the leading edge of an original document between the roller pairs 66 and 68.

In order to facilitate the manual removal of a jammed or wrinkled original document from any portion of the document feed path, the guide structure 28 is constructed so as to automatically separate the roller pair 70 when it is moved to the open position shown in FIG. 2. Thus, the front wall portion 110 has its lower-most edge 128 disposed beyond the pivot axis of the ears 118 so that when the guide 28 is pivoted to the open position, the edge 128 contacts the upper roller of the roller pair 70 and lifts it out of contact with the lower roller. This is possible because of the slots 86 and 88 in which the shaft of the upper roller is received. When the guide 28 is returned to its normal position the springs 94 and 96 urge the upper roller downwardly and into contact with the lower roller.

Referring again to FIG. 1, the guide structure 28 further includes means defining a restricted entryway into the document feed path and an extension thereof in advance of the first roller pair 66 in the direction of document feed. More specifically, the guide structure 28 is preferably formed as two components, the plate member 108 and associated parts described above, and another plate member 130 which, in the illustrated embodiment is pivotally connected as at 132 to the side frame member 14 and 16 adjacent the rear end of the copying machine. The plate 130 has a forwardly extending free end portion 134 which overlaps a rearwardly extending portion 136 of the plate 108 in overlying spaced relationship therewith. Thus the free end portion 134 of the plate 130 defines the portion 136 of plate 108, a restricted entryway 138 into the document feed path.

Referring to FIGS. 1 and 4, the plate 130 is provided with a plurality of wall portions or fins 140 formed on the underside of the plate 130, each fin having a surface corresponding in curvature to that of the reverse bend portion 112 of the plate 108 and spaced therefrom substantially the same as the spacing of the portions 134 and 136. A fixed guide 142 having a curved surface spaced from the reverse bend 112 and terminating adjacent the first roller pair 66 is mounted on a rod 144 disposed between the frame member 14 and 16 and also rests on the upper edge of a partition wall 146. The fixed guide 142 and the fins 140 join at approximately the mid-point of the reverse bend 112 so as to facilitate easy pivotal movement of the plates 130 and 108 as indicated by the dotted line position of each shown in FIG. 1. Thus it is seen that the overlapping portions 134 and 136 of the plates 130 and 108, together with the reverse bend 112, the curved surfaces of the fins 140 and the fixed guide 142 all cooperate to define a portion of the document feed path in advance of the feed roller pair 66.

While the plate member 130 may terminate and be pivotally connected to the machine frame at any point rearwardly of the fins 140, it preferably extends to the rear wall of the machine so as to afford access to that portion of the machine in which the copy paper 30 is stored without the necessity of an auxiliary door or closure for that portion of the machine.

As best seen in FIGS. 1 and 3, a side edge guide 150 mounted on the plate 108, the side edge guide having a bottom plate 152 movably secured to the plate 108 as by one or more screws 154, and on upstanding flange 156 against which the side edge of a document is placed for properly orienting the document before it is inserted into the document feed path.

It will now be appreciated that the sheet conveying means of this invention provides a simple, inexpensive and highly effective way of conveying an original document through the feed path and illuminating station of a photocopy machine, and at the same time permitting complete access to the document feed path and the feeding means for manual removal of a jammed up document by a simple manipulation of a movable guide structure. With the guide structure 28 in the solid line position of FIG. 1, original documents are inserted into the copying machine through the entryway 138, the leading edge of the document being guided toward the nip of the first roller pair 66 by the pins 140 and the fixed guide element 142. Thereafter, the several roller pairs feed the document through the illuminating station 24 in synchronism with movement of the copy paper through the exposing station while copying takes places.

When it is observed that a document has not tracked properly through the plate members 108 and 130 are moved to the position shown in FIG. 2, in which the rollers 70 are held apart and the entire feed path is exposed for removal of the jammed document.

It will now be apparent that there has been provided a document conveying means which avoids the disadvantages of prior art constructions and achieves the foregoing objects. It is to be understood that the invention is not to be limited to the specific embodiment disclosed herein, the same being merely illustrative of the best mode presently contemplated for carrying out the invention, but rather the invention is deemed to cover all such modifications, variations and equivalents thereof as may be deemed to be within the scope of the appended claims.

I claim:

1. In a copying machine having means defining an illuminating station, means defining an exposing station, means including a supply of copy paper for delivering copy paper to the exposing station, and means for exposing and developing an image on the copy paper of the indicia bearing portions of an original document as the original document and copy paper move through their respective stations the combination therewith of means for conveying the original document through the copying machine, said conveying means comprising
   (A) sheet feeding means for feeding an original document past said illuminating station,
   (B) guide means enclosing said feeding means and coacting therewith to define an elongate feed path including said illuminating station, said guide means including means defining a restricted entryway into said elongate feed path and means for guiding the leading edge of a document inserted into said restricted entryway toward said feeding means, and
   (C) means pivotally mounting said guide means for movement between one position in which said guide means coacts with said feeding means to define said feed path and another position in which said guide means is disposed remote from said feeding means so that said feeding means and said feed path are completely exposed and a document therein is accessible for manual removal from said feeding means.

2. A combination according to claim 1 wherein said guide means includes a pair of plate members having adjacent juxtaposed surface portions disposed in closely spaced relationship, said plate members defining said restricted entryway and a portion of said feed path in advance of said feeding means, and means mounting each of said plate members for movement of said surface portions away from each other.

3. A combination according to claim 1 wherein said guide means includes a pair of relatively flat plate members one of which has a free end portion overlying a portion of the other plate member to present closely spaced adjacent overlapping surface portions, said surface portions defining said restricted entryway and a portion of said feed path in advance of said feeding means, said plate members being pivotably mounted on said copying machine at locations remote from said overlapping surface portions so that said surface portions are separable upon pivotal movement of said plate members.

4. A combination according to claim 3 wherein the underlying portion of said other plate members is provided with a substantially U-shaped reverse bend which terminates adjacent said feeding means, and the overlying free end portion of said one plate member is provided with guide means presenting a curved surface portion disposed in spaced relationship with a portion of said U-shaped reverse bend, and a fixed guide means presenting a curved surface disposed in spaced relationship with the remainder of said U-shaped reverse bend, said U-shaped reverse bend, said last named guide means and said fixed guide means comprising said means for guiding the leading edge of a document toward said feeding means.

5. A combination according to claim 1 wherein said feeding means comprises a plurality of spaced apart pairs of feed rollers, at least one pair of feed rollers being disposed adjacent opposite sides of said illuminating station, and wherein said guide means is sufficiently elongated to enclose all of said pairs of feed rollers and has a width substantially equal to the length of said feed rollers whereby said guide means completely encloses said feeding means when in said one position.

6. A combination according to claim 5 wherein one roller of each of said roller pairs is mounted for movement away from the other roller of each pair, and there are resisilient means interconnecting the rollers of each pair and normally urging said rollers into contact with each other, said guide means including means for engaging the movable roller of one of said roller pairs and moving said movable roller out of contact with its adjacent roller when said guide means is moved to said other position.

References Cited

UNITED STATES PATENTS

| | | |
|---|---|---|
| 2,377,525 | 6/1945 | Schutt. |
| 3,051,408 | 8/1962 | Finch _____ 346—145 |
| 3,322,031 | 5/1967 | Ostensen. |
| 3,330,179 | 7/1967 | Zerfahs et al. _____ 95—75 |
| 3,352,218 | 11/1967 | Ostensen _____ 95—75 |
| 3,363,256 | 1/1968 | Evans _____ 346—145 |

NORTON ANSHER, Primary Examiner

R. L. MOSES, Assistant Examiner

U.S. Cl. X.R.

355—13, 16